Oct. 16, 1962   L. P. LEIGH, JR   3,058,305
CONTROL DEVICE FOR AIRCRAFT DEICING APPARATUS
Filed April 16, 1959   3 Sheets-Sheet 3
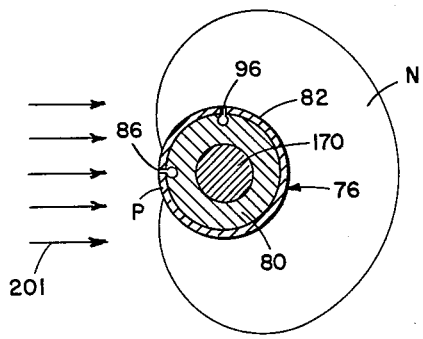
FIG. 9
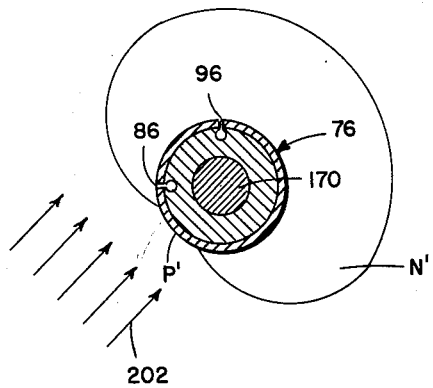
FIG. 10
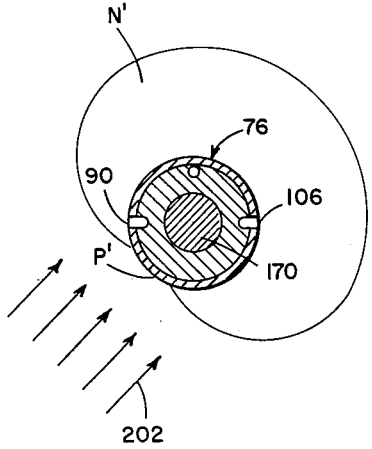
FIG. 11
INVENTOR.
LEONARD P. LEIGH, JR.
BY 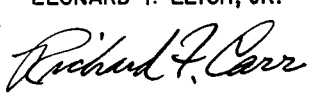
ATTORNEY United States Patent Office 3,058,305
Patented Oct. 16, 1962

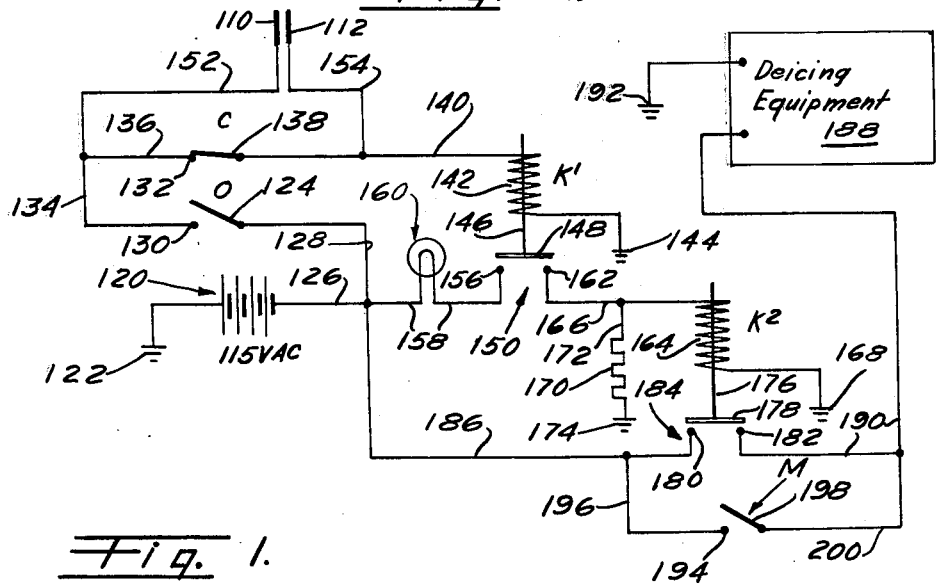
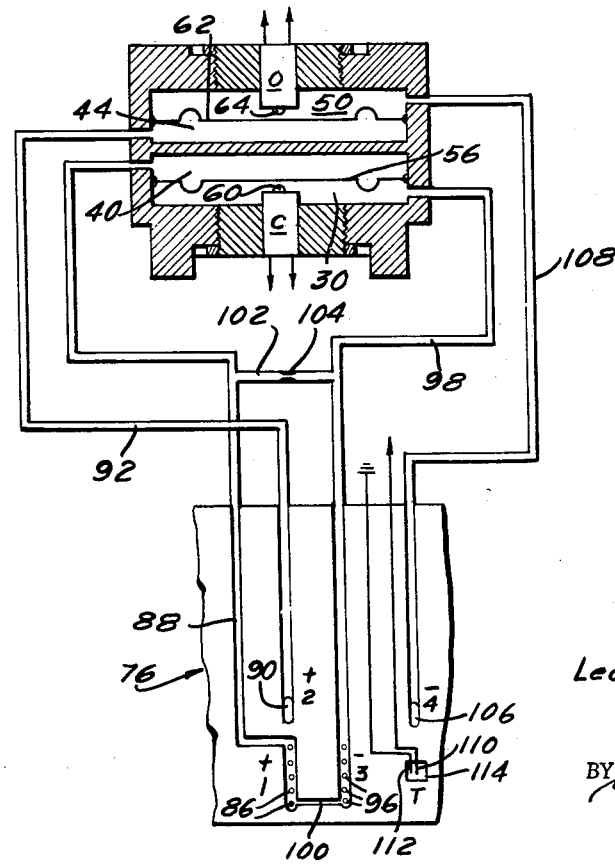

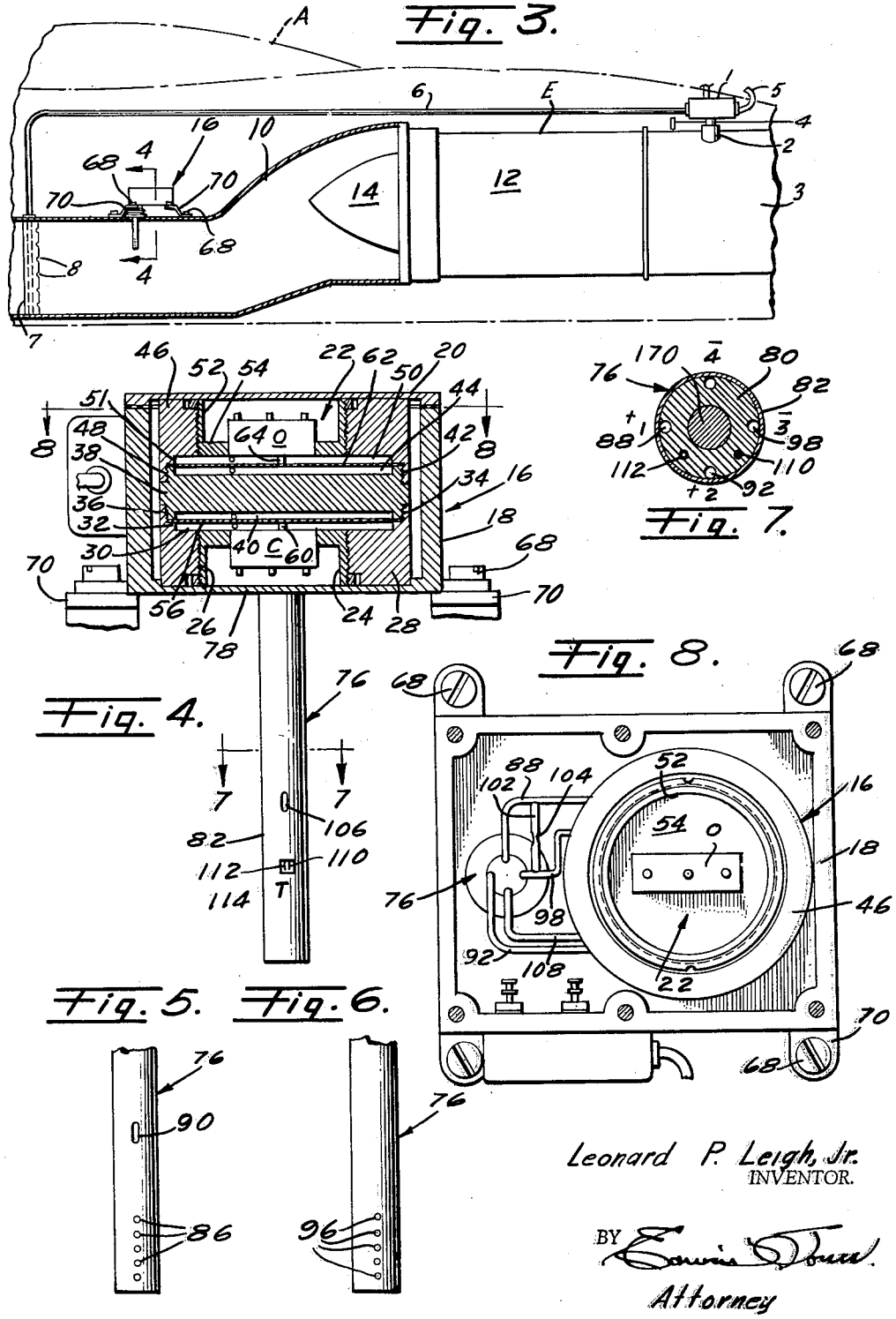

3,058,305
CONTROL DEVICE FOR AIRCRAFT DEICING
APPARATUS
Leonard P. Leigh, Jr., 17809 Chatsworth St.,
Granada Hills, Calif.
Filed Apr. 16, 1959, Ser. No. 809,897
13 Claims. (Cl. 60—39.09)

This application is a continuation in part of my co-pending application Serial Number 763,938, filed September 29, 1958, for Control Device for Aircraft Deicing Apparatus, and now abandoned.

This invention relates generally to an icing-detection system or apparatus for sensing and indicating icing conditions.

While the invention has particular utility in connection with the control of the deicing apparatus such as, for example, is disclosed in my issued Patent No. 2,750,737 for Deicing Apparatus for Jet Engines, and is shown and described in such connection, it is to be understood that its utility is not confined thereto. In the system disclosed in this patent hot air under pressure is provided from a suitable source and the supply of such air to the air-intake duct of a jet engine to prevent icing thereof by a normally-closed valve, the valve being automatically opened by a control means positioned in the air-intake duct, when ice formation on such means occurs. The control means includes a normally-closed electrical switch adapted to be opened by an actuator that is responsive to certain air-pressure conditions in the duct created by the air stream flowing therethrough, the switch being normally maintained opened until ice forms on a nozzle so as to effect discontinuance of air supply to the actuator when the switch is automatically closed to effect opening of the valve.

However, because of the high speeds of present-day aircraft which operate under many different conditions, a more flexible deicing control is needed and it is, therefore, an object of the present invention to effectively meet the various requirements of such present-day aircraft under the various operating conditions thereof.

Another object of the invention is to provide means for creating both positive and negative pressures in a critical icing location, and control means sensitive to both said pressures.

Still another object of the invention is to provide ice-sensing means for an improved pressure-balancing system which includes a plurality of interconnected lead orifices.

A further object of the invention is to provide in apparatus of this character means for draining off moisture from the ice-sensing means.

A still further object of the invention is to provide apparatus of this character wherein foreign matter that might interfere with the operation of the ice-sensing means is eliminated.

Still another object of the invention is to provide apparatus of this character which eliminates false signals that might occur due to, for example, a reversal of pressure on the sensing means or a sudden change in the angle of attack of the air stream on said sensing means.

It has been found that in present high-speed aircraft ice will run back from the leading edge which is clear of ice and it is still another object of the invention to provide apparatus of this character including ice-sensing means that will sense run-back ice at the sides of the probe.

A further object of the invention is to provide apparatus of this character including trailing-edge ice-sensing means.

Another object of the invention is to provide apparatus of this character wherein only the elements having the pressure-sensing ports are located in a critical icing location.

Still another object of the invention is to provide heating means for the probe to remove ice therefrom and clear sensing ports that may be iced up.

A further object of the invention is to provide adjustable switch means capable of fine adjustments.

A still further object of the invention is to provide apparatus of this character that is relatively simple in construction and inexpensive to manufacture.

Another object of the invention is to provide apparatus that is extremely reliable in operation.

The characteristics and advantages of the invention are further sufficiently referred to in connection with the following detailed description of the accompanying drawings which represents one embodiment. After considering this example, skilled persons will understand that many variations may be made without departing from the principle disclosed, and I contemplate the employment of any structures, arrangements or modes of operation that are properly within the scope of the appended claims.

Referring to the drawings:

FIG. 1 is a schematic or diagrammatic view of a sensing and control mechanism embodying the present invention;

FIG. 2 is a wiring diagram of the wiring arrangement of the electrical system of the present invention.

FIG. 3 is an elevational view showing in phantom a portion of an aircraft with the usual air-intake duct for a jet engine, a portion of which is also shown, installed in the aircraft, and with one form of ice-sensing and deicing-control means for the apparatus installed in a critical icing location in the air-intake duct;

FIG. 4 is a sectional view taken on line 4—4 of FIG. 3;

FIG. 5 is a front view of a portion of the probe showing certain of the pressure-sensing ports thereof;

FIG. 6 is a side view of a portion of the probe showing pressure-sensing ports thereof;

FIG. 7 is a sectional view taken on line 7—7 of FIG. 4;

FIG. 8 is a sectional view taken on line 8—8 of FIG. 4;

FIG. 9 is a transverse sectional view of the probe illustrating diagrammatically the pressure distribution around the probe during normal airflow conditions;

FIG. 10 is a view similar to FIG. 9 illustrating the pressure distribution around the probe for a different airflow condition; and FIG. 11 is a view similar to FIG. 10 with the section taken at a different axial position on the probe.

Referring more particularly to the drawings, there is shown in FIG. 3 a conventional aircraft A having a conventional jet engine E and the usual air-intake duct indicated at 10, which leads to the compressor 12 of the engine which has the usual fairing cone 14 at the forward end to uniformly distribute the air to said compressor. Other parts of the engine, such as the combustion chamber and turbine, are of well-known construction and operation. The deicing apparatus, may be of any suitable character, an example of such apparatus being disclosed in my Patent No. 2,750,737 for Deicing Apparatus for Jet Engines.

Such a design may include a heat exchanger 1 receiving hot gases through inlet 2 from turbine section 3 of the engine. A valve 4 controls the flow through the inlet to the heat exchanger. Air is received by scoop 5 and passes forwardly through the heat exchanger 1 where it is given an elevated temperature. The heated air then continues forwardly through conduit 6 to header 7 extending transversely across the air inlet duct 10. The header may include tubes of streamlined contour having downstream outlets 8. Therefore, heated air can be discharged into the inlet duct 10 to effect deicing.

Means for controlling the deicing apparatus is indicated generally at 16 and comprises a housing 18 having a cover 20 attached to the open upper end of said housing by screws or the like, not shown. Within the housing is an electrical control mechanism, indicated generally at 22, and includes a pair of micro-switches C and O. The micro-switch C is normally open and is mounted in an adjustable plug 24 which is externally threaded and threadably received in an internally-threaded bore 26 of a ring 28. In the upper end of ring 28 there is a recess forming a chamber 30, at the upper end of which is a shoulder 32 and at the outer periphery of shoulder 32 there is an upwardly-extending internally-threaded flange 34 for threadable connection with an internally-threaded flange 36 of an intermediate member 38, which has a recess opening toward the recess 30 and forming a pressure chamber 40. At the opposite side of the member 38 there is a flange 42 similar to the flange 36 and extending about a recess forming a pressure chamber 44. There is a ring 46 of similar construction to the ring 28, said ring 46 having an internally-threaded flange 48 receiving the internally threaded flange 42. Ring 46 also has a recess or pressure chamber 50 about which is a shoulder 51, there also being an internally-threaded bore 52 in which is received an adjustable plug 54 having secured therein a normally-open micro-switch O. A movable wall 62 is peripherally clamped between the flange 42 and the adjacent shoulder 51 of the ring 46 and is adapted to actuate a switch member 64 of the micro-switch O.

As best shown in FIG. 3, the housing 18 is mounted outside of the air duct 10 by means of screws 68 received in openings provided therefor in brackets 70.

Means for sensing ice is provided and includes a probe, indicated generally at 76, one end of which is secured to the bottom wall 78 of the housing by any suitable means, such as welding or the like, and said probe extends into the air duct 10 through a suitable opening provided therefor in the wall of said duct.

The probe comprises an inner part or core 80 and an outer tubular sleeve 82 fitted on said core.

There are portions of fluid pressure-transmitting conduits in the probe and openings in certain parts of the probe for sensing pressure at various locations on said probe.

Referring now to FIG. 1 which diagrammatically shows the fluid-pressure system, the leading edge of the probe is provided with a plurality of ports 86 which communicate with a passageway or conduit 88 leading to chamber 40. Above the openings or ports 86 and at said leading edge, there is a relatively large port 90 which communicates with a conduit 92 leading to the pressure chamber 44.

At one side of the probe (i.e., at a location 90° circumferentially from the leading edge) there are a plurality of small ports 96 which are connected with the chamber 30 by means of a conduit 98, the conduits 88 and 98 being connected together adjacent their ported ends by a restricted cross passage 100 which is slightly larger than the individual ports 86 and 96. Water or fine particles of foreign matter that might enter the ports 86 are carried away by means of the cross passage 100 and aid in keeping the system free of such water and foreign matter that would interfere with the proper functioning of the mechanism. Thus, such water or foreign matter is transmitted from ports 86 through passage 100 and out into the airstream by way of ports 96. Because of the flow of air around the probe a vacuum exists around ports 96, as will be made more clear hereinafter, which helps draw such particles from within the probe. Nearly all of such foreign matter exhausts through the lowermost of ports 96 which may be slightly enlarged to facilitate the transmission of this matter. Conduits 88 and 98 are also interconnected at another point by means of a second cross passage 102 which is provided with a restricted orifice 104 to insure the proper function of the apparatus even though the cross passage 100 should become blocked. It is preferable for the system to include both passages, with passage 100 transmitting foreign matter to prevent plugging of the probe while passage 102 allows the system to continue operation even after the end of the probe has become coated with ice. Under the latter circumstances, there is no necessity for removing foreign matter from the probe. Orifice 104 provides the slight bleeding between the conduits 88 and 98 required to insure the required operation of the mechanism.

There is a relatively large orifice 106 at the trailing edge of the probe and said orifice 106 is connected to the chamber 50 by means of a passageway or conduit 108.

There is also another ice-sensing means at the trailing edge which is indicated at T. This device comprises a pair of spaced contacts or wires 110 and 112 disposed in a recess 114 opening from the outer surface of the probe. The contacts 110 and 112 are connected into the electrical system as best shown in FIG. 2, and when ice forms on said contacts the ice serves to complete the electrical circuit therebetween. It is feasible to use this type of ice-sensing means at the trailing edge because water will not form on the contacts, thereby giving a false reading, when they are so located. If spaced contacts were to be positioned at the leading edge of the probe, for example, moisture from the air would form thereon and complete the circuit through such contacts prior to encountering an icing condition. However, moisture will not condense on contacts at the trailing edge of the probe and the circuit between contacts 110 and 112 will be completed only when ice forms therebetween.

The electrical system, shown diagrammatically in FIG. 2, includes the normally-closed switch C and the normally-open switch O, such switches being arranged in series. The contacts 110 and 112, which also serve as a switch, are in parallel with the switch C and in series with the switch O. The system includes a source of electrical power shown as a battery 120 which is grounded at 122. The other side of the battery is connected to the movable switch member 124 by means of wires 126 and 128. The fixed contact 130 of the switch O is connected with the fixed contact 132 of the switch C by means of wires 134 and 136. The movable member or contact 138 of the switch C is connected by means of a wire 140 with one end of the coil 142 of an instantaneous relay K¹, the other end of said coil 142 being grounded at 144. The armature 146 of the relay K¹ is connected and adapted to actuate a movable switch member 148 of a normally-open switch indicated generally at 150. The contacts 110 and 112 of the device T are connected by wires 152 and 154 with wires 136 and 140 respectively at opposite sides of the switch C.

One of the fixed contacts 156 of the switch 150 is connected to the power wire 126 by means of an electrical line 158 which has interposed therein a signal light 160. The other fixed contact 162 of the switch 150 is connected to one end of the coil 164 of a timed relay K² by means of a wire 166, the outlet end of said coil being grounded at 168.

The probe is provided with a heating element 170 which has one end connected by a wire 172 to the wire 166, the opposite end of said element being grounded at 174.

Relay K² has an armature 176 which carries a movable contact or switch member 178 adapted to engage contacts 180 and 182 of a switch indicated generally at 184. The contact 180 is connected to the wire 126 by means of a wire 186 and the contact 182 is connected to deicing equipment 188 by means of a wire 190. The deicing equipment may be of any suitable type such as that shown in my Patent No. 2,750,737 above referred to, and is grounded at 192. The electrical system also includes a master switch M having a fixed contact 194 connected to the wire 186 by means of a wire 196 and a movable switch or contact member 198 which is connected to the wire 190 by means of a wire 200, switch M being arranged in parallel with switch 184 and when closed will effect energization of the deicing equipment even though the rest of the mechanism does not call for operation of said deicing mechanism.

Now, when there is no air-flow through the duct 10, the diaphragms 56 and 62 are in their normal rest positions, switch C then being closed and switch O being in the open position. The relays $K^1$ and $K^2$ are deenergized so that switches 150 and 184 are open and the deicing equipment 188 is inoperative.

As soon as there is air-flow through the duct 10 there will be positive pressure on the ports 86 and the port 90 of the probe, these ports being at the leading edge of the probe. Negative pressure will prevail on the ports 96 and on the port 106. This is in accordance with recognized principles of aerodynamics illustrated diagrammatically in FIG. 9. With air flowing through the duct 10 in the direction indicated by arrows 201 positive pressure will be imposed upon a relatively narrow leading edge portion P of the probe while a vacuum exits around the remainder of the probe in zone N. The result is the aforementioned positive pressure at leading edge ports 86 and 90, and negative pressure at side ports 96 and trailing edge port 106. The positive pressure on the ports 86 will be transmitted to the chamber 40 and the negative pressure on the ports 96 will be transmitted to the chamber 30. The restricted nature of passageways 100 and 102 does not permit pressures to equalize in chambers 30 and 40 under these conditions and assures that the pressure differential is maintained. Thus, there is created a differential of pressure on opposite sides of the diaphragm 56 with the higher pressure in the chamber 40, so that the diaphragm will be moved downwardly to actuate the member 60 of the micro-switch C and effect opening thereof. Simultaneously, positive pressure will be transmitted from the port 90 to the chamber 44 and negative pressure will be transmitted from the port 106 to the chamber 50 so that there is a differential of pressure on opposite sides of the diaphragm 62 with the higher pressure in the chamber 44 so that the diaphragm 44 will be moved to actuate the switch member 64 of the micro-switch O and effect closing of said switch. Generally, the system is set for such movement of switches C and O to take place at a predetermined air velocity in duct 10. In a typical example this velocity may be around 125 miles per hour. Below such speed there is no requirement on the part of the airplane for operation of deicing equipment 188, so there is no necessity for arming the system by closing switch O and opening switch C. It will be readily apparent that when the switch C is opened and switch O is closed by air-flow through the duct 10 the electrical system will still be deenergized.

Should ice form on the leading edge of the probe the ports 86 will be blocked. As the port 90 is relatively large blocking thereof by ice will not occur as the blocking of the ports 86 will effect energizing of the deicing apparatus and heating element 170 before port 90 can be blocked by ice. Even if port 90 should become plugged by ice, the air under positive pressure would be sealed in chamber 44 by the ice, which would maintain switch O in the closed position. With this in mind, it will be assumed at this point that the ports 86 are iced over. The result will be a cutting off of positive pressure from the chamber 40. However, there will be a bleeding of air through the cross passage 100, and the cross passage 102, so that negative pressure from the ports 96 is transmitted not only to the chamber 30 by way of the conduit 98, but also to the passage 88 and thence to the chamber 40 so that the pressures at opposite sides of the diaphragm 56 will be balanced, thereby returning diaphragm 56 to its neutral position. Switch C then closes which, with switch O also closed, will energize the relay $K^1$. Energizing of the relay $K^1$ effects closing of the switch 150 and energizing of the relay $K^2$ which effects closing of the switch 184 to turn on the deicing equipment. The latter relay is timed to maintain the switch 184 closed for a predetermined period of time such as, for example, three minutes so that the deicing equipment will operate for this length of time. Simultaneously with the closing of switch 150 and signal light 160 is turned on and a heating element 170 is likewise turned on to warm the probe to effect deicing of the same to thereby open the ports 86 again. When ports 86 are no longer clogged by ice, diaphragm 56 will move switch C back to its open position, but the deicing equipment will remain in operation for the period of time determined by relay $K^2$.

Plugging of the ports 96 also indicates an icing condition, but of such nature that the ice forms only at the sides of the probe, that is run-back icing. With ports 86 open, this also results in a pressure balance in the chambers 30 and 40 as the positive pressure from ports 86 bleeds through passageways 100 and 102. As a result, the diaphragm 56 will return to the neutral position and the switch C will be closed to energize the deicing apparatus. In this manner, the system operates as well for icing conditions of this type—just as damaging to the engine of the aircraft as any other—which cannot be accomplished by a design having no sensing means at the side of the probe. Also, it makes no difference if icing occurs simultaneously at the leading and side edges of the probe rather than individually on one or the other. With both ports 86 and 96 plugged by ice, the pressure in chambers 30 and 40 will balance, closing switch C to energize the relays.

As soon as the ice has melted on the probe, the pressure differential across the diaphragm 56 will again be such as to cause said diaphragm to open the switch C thereby deenergizing the electrical system.

The trailing-edge ice sensing or indicating means comprises the device T which causes the deicing equipment to come into operation even though the icing is such that neither the leading edge nor the side edge ports will detect the condition.

For example, trailing-edge icing, which becomes a major problem in present high-speed aircraft, may occur in the absence of leading-edge or side-edge icing and under such conditions the deicing equipment would not be energized by the airflow or pressure-sensing mechanism. To overcome this difficulty, I provide the trailing-edge ice indicator T so that trailing-edge ice will form on the contacts 110 and 112 and serve as a bridge across which electrical energy will flow to give the icing signal and energize the deicing apparatus, the switch C being open and the switch O being closed.

From the foregoing it will be readily apparent that the present invention will provide the proper signal for leading-edge icing, run-back or side-edge icing, and trailing-edge icing.

The system of this invention is arranged to prevent false icing signals or spurious operation of the deicing equipment. In some instances the angle of attack of the airstream in duct 10 will change with respect to probe 76. This may occur during maneuvering of the aircraft. As a result the pressure pattern around the probe will shift in accordance with the new relationship of the airstream to the probe. Therefore, when air is flowing across probe 76 in the direction indicated by arrows 202 in FIG. 10, negative pressure zone N' has shifted circumferentially around the probe from the position of zone N of FIG. 9. This causes ports 86 as well as ports 96 to fall within vacuum zone N', thereby equalizing the pressure on both sides of diaphragm 56 which causes switch C to close. This completes the circuit through leads 136 and 140. However, as seen in FIG. 11, this shifting of the vacuum zone also places port 90, which is axially directly above ports 86, within zone N' while trailing-edge port 106 remains within the negative pressure zone. None of the ports then are within positive pressure area P'. This means that both ports 90 and 106 are subjected to the same pressure, equalizing the forces on diaphragm 62. Switch O, therefore, returns to its normally open position and the circuit through lead 134 is interrupted. Thus, even though the pressure equalization on ports 86 and 96 would complete the circuit to relays K¹ and K², the attendant equalization of ports 90 and 106 opens the circuit to the relays and prevents operation of the deicing equipment.

A similar effect is obtained if the angle of attack shifts around the probe in the other direction. If ports 86 and 96 are brought into the vacuum zone, ports 90 and 106 are similarly shifted into this zone and the circuit is opened. Even if the airflow is reversed 180° from the direction of FIG. 9, with the port 106 then being located at the leading-edge, the device will not falsely indicate an icing condition. Despite the fact that the pressure would then be equalized on ports 86 and 96, the positive pressure on port 106 would move diaphragm 62 away from switch O and that switch would open to break the circuit to the relays.

It can be seen, therefore, that no matter what airflow condition exists within ducts 10 the system will not come into operation until icing actually occurs.

Adjustment of the rings 28 and 46 inwardly or outwardly moves the switches C and O toward or away from the diaphragms 56 and 62 respectively to thereby adjust the response characteristics of the mechanism.

These settings are made so that when air initially begins to flow through duct 10 and reaches the predetermined value at which the icing system becomes armed, switch C will open before switch O closes. This assures that the closure of switch O will not falsely indicate that an icing condition is present. For a similar reason, when the velocity of air through the duct falls below the minimum value for arming the system, switch O will be caused to open prior to the closure of switch C. Thus, under no circumstances will the circuit be completed to the relays solely on account of a change in velocity through duct 10.

Referring particularly to FIG. 8, it will be noted that portions of the conduits 88, 92, 98 and 108 between the chambers 30, 40, 44 and 50 and the upper end of the probe are outside the duct 10 as well as the cross passage 102 so that these portions and said passage cannot become clogged with ice.

It should be observed that, while it is preferred to incorporate all of the ice detecting functions in a single unit as illustrated, certain of the components may be operated separately. For exmple, the trailing-edge spaced contacts may be located on an additional probe and made to operate independently the electrical system of the deicing equipment. The electrical connection of the trailing edge ice detector so arranged is essentially the same as shown in FIG. 2, but switches C and O are eliminated.

Similarly, the deicing system may be operated entirely by the pressures on leading and side-edge ports 86 and 96. If this is done, switch O, the other ports and their pressure chamber are omitted. Such modifications, however, mean that many desirable features of a compact, universal ice detecting arrangement are not included.

It is thought that the invention and many of its attendant advantages will be understood from the foregoing description and it is believed that it will be apparent that various changes may be made in the form, construction and arrangement of the parts without departing from the spirit and scope thereof or sacrificing all of its material advantages, the arrangement hereinbefore described being merely for purposes of illustration.

I claim:

1. In control means for deicing apparatus for the air inlet duct of jet engines: a housing adapted to be mounted exteriorly of the duct and having first and second pairs of sensing pressure chambers therein; a normally-closed switch having a movable switch member extending into one of the chambers of the first set of chambers; a flexible diaphragm separating the first pair of chambers and adapted to actuate said switch member when there is a predetermined pressure differential established in said first pair of chambers; a normally-open switch having a movable switch member extending into one of the chambers of the second pair of said chambers; a flexible diaphragm separating said second pair of chambers and adapted to actuate said switch member upon the establishment of a predetermined pressure differential in said second pair of chambers; an electrical system for operating a deicing apparatus in which said switches are connected together in series; a probe adapted to extend into the air duct, said probe having a plurality of relatively small ports in the leading edge, said ports being spaced apart longitudinally relative to the probe and connected with a conduit which in turn is connected with one of the first pair of pressure chambers, said probe also having a plurality of relatively small ports at one side spaced apart longitudinally relative to the probe and connected with a conduit which in turn is connected with the other of said first pair of pressure chambers, said switch member extending into the latter chamber, said probe also having a relatively large port in the leading edge of said probe and spaced from the first-mentioned ports, said relatively large port being connected with a conduit leading to one of the second pair of chambers; a relatively large port at the trailing-edge of the probe and connected with a conduit leading to the other of said second pair of chambers; a recess in the trailing-edge of the probe; a pair of electrical contact members extending into said recess for receiving ice therebetween; and wires connecting said contact members in the electrical system in series with the normally-open switch and in parallel with the normally-closed switch.

2. In control means for deicing apparatus for the air inlet duct of jet engines: a housing adapted to be mounted exteriorly of the duct and having a first pair of sensing pressure chambers; a normally-closed switch having a movable switch member; a flexible diaphragm separating said first pair of chambers and adapted to actuate said switch member when there is a predetermined pressure differential established in said chambers; a second pair of chambers defined by said housing; a normally-open switch having a movable switch member; a flexible diaphragm separating said second pair of chambers and adapted to actuate said switch member of said normally open switch upon the establishment of a predetermined pressure differential in said second pair of chambers; an electrical system for operating a deicing apparatus in which said switches are connected together in series; a probe adapted to extend in to the air duct, said probe having a plurality of leading-edge ports connected with a conduit which in turn is connected with one of the sensing chambers of the first pair of chambers, said probe having a plurality of side ports connected with a conduit which in turn is connected with the other of the sensing chambers of said first pair, a relatively large port at the leading-edge of said probe, said relatively large port being connected with a conduit leading to one of the second pair of chambers, a relatively large port at the trailing edge of the probe and connected with a conduit leading to the other of said second pair of chambers; a pair of electrical contact members at the trailing edge of the probe for receiving ice therebetween; and wires connecting said contact members in the electrical system in parallel with the normally-closed switch.

3. In control means for deicing apparatus for the air inlet duct of jet engines: a housing having first and second pairs of sensing pressure chambers therein; a normally-closed switch having a movable switch member extending into one of the chambers of the first set of chambers; a flexible diaphragm separating the first pair of chambers and adapted to actuate said switch member when there is a predetermined pressure differential established in said first pair of chambers; a normally-open switch having a movable switch member extending into one of the chambers of the second pair of said chambers; a flexible diaphragm separating said second pair of chambers and adapted to actuate the normally-open switch member upon the establishment of a predetermined pressure differential in said second pair of chambers; an electrical system for operating a deicing apparatus in which said switches are connected together in series; a probe adapted to extend into the air duct, said probe having a plurality of relatively small ports in the leading edge, said ports being spaced apart longitudinally relative to the probe and connected with a conduit which in turn is connected with one of the first pair of pressure chambers, said probe also having a plurality of relatively small ports at one side spaced apart longitudinally relative to the probe and connected with a conduit which in turn is connected with the other of said first pair of pressure chambers, said first mentioned switch member extending into the latter chamber, said probe also having a relatively large port in the leading edge of said probe and spaced from the first-mentioned ports, said relatively large port being connected with a conduit leading to one of the second pair of chambers; a relatively large port at the trailing edge of the probe and connected with a conduit leading to the other of said second pair of chambers; a recess in the trailing edge of the probe; a pair of electrical contact members extending into said recess for receiving ice therebetween; and wires connecting said contact members in the electrical system in parallel with the normally-closed switch.

4. In control means for deicing apparatus for the air inlet duct of jet engines: means defining first and second pairs of sensing pressure chambers, said means including respective movable wall members separating the chambers of the first and second pairs of chambers; a normally-closed switch for one of the chambers of the first pair of chambers adapted to be actuated by the wall member thereof when there is a predetermined pressure differential established in said chambers; a normally-open switch for one of the chambers of the second pair of said chambers adapted to be actuated by the wall member separating said second pair of chambers upon the establishment of a predetermined pressure differential in said second pair of chambers; an electrical system for operating a deicing apparatus in which said switches are connected together in series; a probe adapted to extend into the air duct, said probe having pressure-sensing means connected with the first pair of chambers for sensing air pressure at the leading edge and one side of said probe, said probe also having air pressure-sensing means connected with the second pair of chambers, said means sensing air pressure at the leading and trailing edges respectively of the probe; and a pair of electrical contact members at the trailing edge of the probe for receiving ice therebetween, said electrical contact members being connected with said electrical system in parallel with the normally-closed switch.

5. In a control device for aircraft deicing apparatus having an electrical system, switch means for controlling said electrical system; pressure responsive means for actuating said switch means; a probe positioned to be in a relatively moving airstream upon operation of said aircraft, and arranged to receive formations of ice from said airstream, said probe having a plurality of ducts each of which communicates with the exterior of said probe by means of groups of openings in said probe for sensing pressure resulting from said airstream around said probe, said groups of openings being circumferentially spaced one from the other and arranged to provide one of said groups at the leading edge of said probe, and another of said groups at a side edge of said probe, thereby to provide actuating pressures in said ducts, said ducts communicating with said pressure responsive means to exert operating pressures thereon for causing said means to actuate said switch means to energize said electrical system when icing is encountered on said probe; and trailing edge ice detecting means on the downstream side of said probe electrically connected in parallel with said switch means for energizing said electrical system when ice forms on said trailing edge ice detecting means.

6. In a control device for aircraft deicing apparatus having an electrical system: a normally-closed switch and a normally-open switch for said electrical system; pressure-responsive elements controlling said switches; a probe positioned to be in a relatively moving airstream upon operation of said aircraft, and arranged to receive formations of ice from said airstream, said probe having a plurality of ducts, said ducts communicating with the exterior of the probe by means of circumferentially spaced groups of openings one of said groups being disposed at the leading edge of said probe, and another of said groups being disposed on a side edge of said probe for sensing pressure to provide actuating pressures in said ducts when air flows across said probe, said ducts communicating with different sides of said pressure-responsive elements to provide differential pressures thereacross causing said elements to actuate said normally-open switch to the closed position and said normally-closed switch to the open position, said ducts having interconnecting means for closing said normally-closed switch when icing occurs on said probe; and trailing-edge ice-detecting means on the downstream of said probe electrically connected in parallel with said normally closed switch for energizing said electrical system when ice forms on said trailing-edge ice-detecting means, said trailing-edge ice detecting means including a pair of electrical contacts spaced apart.

7. In a control device for aircraft deicing apparatus having an electrical system: a probe upon which ice may be formed, said probe having a leading edge at the upstream side thereof, a trailing edge at the downstream side thereof, and a side edge intermediate said leading end trailing edges, said probe further having leading and side-edge ice-sensing means for controlling said electrical system, said ice-sensing means being responsive to pressure at the leading and side edges of said probe, and including means for energizing said system when ice forms at said leading edge or said side edge of said probe; and trailing-edge ice-detecting means connected to said electrical system for energizing said system when ice forms on said trailing edge ice detecting means.

8. A device as recited in claim 7 in which said probe is substantially cylindrical, and said leading and side-edge ice-sensing means include ports in said leading and side edge substantially flush with the exterior surface of said probe.

9. In control means for aircraft deicing apparatus for the air-inlet duct of jet engines, said deicing apparatus having an electrical system: a housing mounted exteriorly of the duct and having a pair of sensing pressure chambers therein; a normally-closed switch for said electrical system; a flexible diaphragm separating the chambers and adapted to actuate said switch member when there is a predetermined pressure differential established in said chambers; and a probe extending into the air duct, said probe having a plurality of relatively small ports in the leading edge, said ports being spaced apart longitudinally relative to the probe and connected with a conduit which in turn is connected with one of said pair of pressure chambers, said probe also having a plurality of relatively small ports at one side spaced apart longitudinally relative to the probe and connected with a conduit which in turn is connected with the other of said pair of pressure chambers, there being a restricted cross passageway in said probe inside said duct between said conduits for transmitting foreign material entering said leading edge ports to exhaust through said side edge ports, and a second cross passageway having a restricted orifice therein between said conduits, the latter passageway being located outside of said duct, the restricted nature of said cross passageways maintaining a normal pressure differential between said conduits.

10. In combination with an aircraft having a deicing apparatus, a control device for said deicing apparatus comprising a probe adapted for insertion in a relatively moving airstream upon operation of an aircraft, said probe having a leading edge, a trailing edge, and a side edge intermediate said leading and trailing edges; a first pair of chambers; a pressure responsive means in communication with said chambers; means connected with said pressure responsive means for actuating said deicing apparatus upon substantial equalization of the pressures in said chambers; relatively small port means in said leading edge of said probe communicating with one of said first pair of chambers; relatively small port means on said side edge of said probe communicating with the other of said chambers; restricted passage means interconnecting said port means; a second pair of chambers; a second pressure responsive means in communication with said second pair of chambers; means connected with said second pressure responsive means for rendering said deicing apparatus inoperative upon substantial equalization of the pressures in said second pair of chambers despite the pressures in said first pair of chambers; relatively large port means in said leading edge of said probe communicating with one of said second pair of chambers; and port means in said trailing edge of said probe communicating with the other of said second pair of pressure chambers.

11. In combination with a movable vehicle having a deicing apparatus, a control device for said deicing apparatus comprising
a probe adapted for insertion in a relatively moving airstream upon movement of said vehicle,
said probe having
a leading edge,
a trailing edge,
and a side edge intermediate said leading and trailing edges;
means for sensing pressure at said leading edge;
means for sensing pressure at said trailing edge;
means responsive to a differential in pressure between said leading and trailing edges for rendering said deicing apparatus operative;
a second means for sensing pressure at said leading edge;
means for sensing pressure at said side edge;
means responsive to the pressures of said second leading edge pressure sensing means and to said side edge pressure sensing means for rendering said deicing apparatus inoperative upon the existence of a pressure differential at said second leading edge and said side edge pressure sensing means,
said second leading edge pressure sensing means and said side edge pressure sensing means including bleed means therebetween for equalizing the pressures sensed by both when ice forms over either,
said means responsive to said second leading edge pressure responsive means and said side edge pressure responsive means rendering said deicing apparatus operative upon the existence of said equal pressures.

12. In combination with a movable vehicle having a deicing apparatus, a control device for said deicing apparatus comprising
a probe adapted for insertion in a relatively moving airstream upon movement of said vehicle,
said probe having
a leading edge,
a trailing edge,
and a side edge intermediate said leading and trailing edges;
means for sensing pressure at said leading edge;
means for sensing pressure at said trailing edge;
means responsive to a differential in pressure between said leading and trailing edges for rendering said deicing apparatus operative;
a second means for sensing pressure at said leading edge;
means for sensing pressure at said side edge;
means responsive to the pressures of said second leading edge pressure sensing means and to said side edge pressure sensing means for rendering said deicing apparatus inoperative upon the existence of a pressure differential at said second leading edge and said side edge pressure sensing means,
and for rendering said deicing apparatus operative upon an equilization of pressure at said second leading edge and said side edge pressure sensing means,
said second means for sensing pressure at said leading edge including relatively small port means communicating with the exterior of said probe
and a passageway in said probe connected thereto,
said means for sensing pressure at said side edge including relatively small port means communicating with the exterior of said probe,
and a passageway in said probe connected thereto;
and restricted passageway means interconnecting said passageway of said second leading edge pressure sensing means and said passageway of said side edge pressure sensing mean.

13. A deicing device comprising a probe adapted for insertion in a relatively moving airstream, pressure sensitive means on said probe, said pressure-sensitive means including means for sensing pressure at the leading edge of said probe, means for sensing pressure at the trailing edge of said probe, and means for sensing pressure at a location intermediate said leading edge and said trailing edge, deicing means connected to said pressure-sensitive means and operable when ice forms on said means for sensing pressure at said leading edge or on said means for sensing pressure at said location intermediate said leading edge and said trailing edge, heater means for removing ice from said probe, said heater means being operable upon formation of ice on any of said pressure-sensing means, and timing means for continuing operation of said deicing means for a predetermined period of time following the formation of ice on a sensing means for causing said deicing means to operate after ice has been removed from said probe by said heater means.

References Cited in the file of this patent

UNITED STATES PATENTS

| | | |
|---|---|---|
| 2,338,574 | Cunningham | Jan. 4, 1944 |
| 2,414,296 | Gill | Jan. 14, 1947 |
| 2,557,311 | Pond | June 19, 1951 |
| 2,705,866 | Quinby et al. | Apr. 12, 1955 |
| 2,744,992 | Spears | May 8, 1956 |
| 2,870,633 | Harding et al. | Jan. 27, 1959 |

FOREIGN PATENTS

| | | |
|---|---|---|
| 555,247 | Canada | Apr. 1, 1958 |
| 555,600 | Canada | Apr. 8, 1958 |
| 735,296 | Great Britain | Aug. 17, 1959 |

(Corresponding U.S. 2,744,992, May 8, 1956)